United States Patent [19]

Ishii et al.

[11] Patent Number: 5,288,801
[45] Date of Patent: Feb. 22, 1994

[54] POLYCARBONATE RESIN COMPOSITION

[75] Inventors: Kazuhiko Ishii; Makoto Mizutani, both of Kanagawa, Japan

[73] Assignee: Mitsubishi Gas Chemical Company, Inc., Tokyo, Japan

[21] Appl. No.: 964,843

[22] Filed: Oct. 22, 1992

[30] Foreign Application Priority Data

Oct. 23, 1991 [JP] Japan .................. 3-304102

[51] Int. Cl.$^5$ .................. C08L 53/00; C08F 8/16
[52] U.S. Cl. .................. 525/92; 524/505; 525/386; 525/450; 525/468
[58] Field of Search .................. 528/354; 525/64, 67, 525/68, 69, 92, 386, 450, 468; 524/14, 505

[56] References Cited

U.S. PATENT DOCUMENTS

| | | |
|---|---|---|
| 3,652,720 | 3/1972 | Wright . |
| 3,764,639 | 10/1973 | Hsieh et al. . |
| 4,255,534 | 3/1981 | Liu . |
| 4,900,785 | 2/1990 | Leitz et al. .................. 525/67 |
| 4,994,508 | 2/1991 | Shiraki et al. .................. 524/14 |

Primary Examiner—John Kight, III
Assistant Examiner—Shelley A. Dodson
Attorney, Agent, or Firm—Sughrue, Mion, Zinn, Macpeak & Seas

[57] ABSTRACT

A polycarbonate resin composition comprising (a) an aromatic polycarbonate resin, (b) a rubber-polyester block copolymer comprising an aliphatic diene-based rubber having at one or both ends thereof a polyester structural unit formed by ring-opening polymerization of an aliphatic lactone with the aliphatic diene-based rubber, and (c) an inorganic filler.

10 Claims, No Drawings

POLYCARBONATE RESIN COMPOSITION

FIELD OF THE INVENTION

The present invention relates to a reinforced polycarbonate resin composition having excellent flowability and surface appearance and suitable for use in the field of industrial machines and apparatuses such as housings, mechanical chassis, and the like.

BACKGROUND OF THE INVENTION

Reinforced polycarbonate resin compositions are being utilized in a wide range of industrial fields due to their high rigidity and good dimensional stability. However, such polycarbonate resin compositions have poor flowability and the range of the utilization of the resin compositions has been limited. For example, when such a resin composition is used in moldings for producing camera parts or other thin-wall molded parts or for producing large molded articles or parts such as OA mechanical chossis, the molding must be conducted by increasing the molding temperature and mold temperature, resulting in decrease in production efficiency. As a means for improving the flowability of reinforced aromatic polycarbonate resin compositions, JP-B-3-24501 discloses addition of a low molecular weight polycarbonate for improving the surface appearance of molded articles and the flowability. (The term "JP-B" as used herein means an "examined Japanese patent publication".) This technique, however, cannot produce a sufficient effect in improving flowability and, further, the surface appearance of molded articles obtained by this technique is still unsatisfactory. JP-A-63-6051 discloses a technique of adding a specific polycaprolactone to a composition comprising a polycarbonate resin and glass fibers to improve flowability and surface appearance. (The term "JP-A" as used herein means an "unexamined published Japanese patent application".) However, the composition thus modified has had a disadvantage that a heat resistance thereof is greatly reduced.

Accordingly, these techniques have failed to greatly improve the flowability of reinforced polycarbonate resin molding materials and to improve the appearance of molded articles obtained therefrom, while retaining physical properties such as rigidity of the molding materials.

SUMMARY OF THE INVENTION

The present inventors have conducted intensive studies to improve the flowability and surface appearance of reinforced aromatic polycarbonate resin compositions. As a result, it has been found that when a specific rubber-polyester block copolymer is added to a polycarbonate resin and inorganic fillers, the flowability of the composition is improved greatly while retaining physical properties such as rigidity of the polycarbonate resin. The present invention has been completed based on this finding.

Accordingly, an object of the present invention is to provide a polycarbonate resin composition having excellent flowability and surface appearance, while retaining the inherent physical properties of the polycarbonate resin.

The present invention provides a polycarbonate resin composition comprising (a) an aromatic polycarbonate resin, (b) a rubber-polyester block copolymer comprising an aliphatic diene-based rubber having at one or both ends thereof a polyester structural unit formed by ring-opening polymerization of an aliphatic lactone with the aliphatic diene-based rubber, and (c) an inorganic filler.

DETAILED DESCRIPTION OF THE INVENTION

The aromatic polycarbonate resin used in the present invention is a thermoplastic polycarbonate produced by reacting either an aromatic dihydroxy compound or the aromatic dihydroxy compound and a small amount of a polyhydroxy compound with phosgene or a carbonic acid diester. The thermoplastic polycarbonate may have a branched structure.

Examples of the aromatic dihydroxy compound include 2,2-bis(4-hydroxyphenyl)propane (=bisphenol A), tetramethylbisphenol A, tetrabromobisphenol A, bis(4-hydroxyphenyl)-p-diisopropylbenzene, hydroquinone, resorcinol, and 4,4-dihydroxydiphenyl. Of these, bisphenol A is particularly preferred.

A branched aromatic polycarbonate resin can be obtained by replacing a part, e.g., from 0.1 to 2 mol %, of the dihydroxy compound with the polyhydroxy compound, such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)-benzene, or 1,1,1-tri(4-hydroxyphenyl)-ethane, or with other compound such as 3,3-bis(4-hydroxyaryl)oxindole (=isatinbisphenol), 5-chloroisatin bisphenol, 5,7-dichloroisatin bisphenol, or 5-bromoisatin bisphenol.

Aromatic monohydroxy compounds suitable to adjust a molecular weight of aromatic polycarbonate resin preferably are m- and p-methylphenols, m- and p-propylphenols, p-bromophenol, p-tert-butylphenol, and p-(long-chain alkyl)-substituted phenols. Representative examples of the aromatic polycarbonate resin include polycarbonates obtained using bis(4-hydroxyphenyl)alkane-type dihydroxy compounds, especially bisphenol A, as a main raw material. Examples thereof further include polycarbonates obtained from halogen-containing bisphenols such as tetrabromobisphenol A, copolycarbonates obtained using two or more aromatic dihydroxy compounds in combination, and branched polycarbonates obtained by combined use of a small amount of a trihydric phenol compound with the aromatic dihydroxy compound. The aromatic polycarbonate resin may be used as a mixture of two or more aromatic polycarbonates.

The rubber-polyester block copolymer used in the present invention comprises an aliphatic diene-based rubber having at one or both ends thereof a polyester structural unit formed by ring-opening polymerization of an aliphatic lactone with the aliphatic diene-based rubber.

The aliphatic diene-based rubber used has a number-average molecular weight of usually from 1,000 to 4,000 and usually has, at both ends of the molecule thereof, a functional group such as carboxyl group, hydroxyl group, vinyl group, amino group, or the like, preferably hydroxyl group.

Examples of the diene compound which constitutes the aliphatic diene-based rubber include butadiene, isoprene, chloroprene, and 1,3-pentadiene. Of these compounds, butadiene is preferred.

Examples of the aliphatic diene-based rubber include α,ω-1,2-polybutadiene glycol, hydrogenated α,ω-1,2-polybutadiene glycol, hydroxyl-terminated 1,4- polybutadiene, liquid polychloroprene, liquid polyisoprene, and liquid natural rubber. Preferred of these diene-based rubbers are polybutadiene-type compounds and partly or completely hydrogenated polybutadiene-type compounds.

The rubber-polyester block copolymer preferably is produced from an aliphatic diene-based rubber having a hydroxyl group at one or both ends of the molecule thereof and an aliphatic lactone by successive ring-opening polymerizing the aliphatic lactone onto the hydroxyl group(s) of the rubber in the presence of a catalyst to form a rubber-polyester block copolymer. In an industrially advantageous method for stably obtaining this block copolymer, an aliphatic diene-based rubber having a hydroxyl group in the molecule thereof is used as a starting material and an aliphatic lactone is polymerized with the hydroxyl group of the rubber by successive ring-opening polymerization in the presence of a catalyst, thereby to form a polyester chain linked to the aliphatic diene-based rubber through the hydroxyl group thereof. A representative example of the aliphatic lactone is ε-caprolactone. Preferred examples of the catalyst for use in the successive ring-opening polymerization for polymerizing the aliphatic lactone onto the hydroxyl group present in the rubber as a functional group include titanium-containing catalysts such as tetrabutyl titanate, tetrapropyl titanate, and tetraethyl titanate, and tin-containing catalysts such as dibutyltin oxide, tin octylate, and stannous chloride. Although the end group of the polyester chain in the block copolymer usually is hydroxyl group, it is preferred that the polyester chain be terminated by a non-reactive group through an ester bond, ether bond, or urethane bond. This is accomplished by acetylation with acetic anhydride or silyl-etherification with a silylating agent.

In the present invention, the amount of the rubber-polyester block copolymer used is generally from 1 to 20% by weight based on the total weight of the polycarbonate resin and the block copolymer. If the amount of the block copolymer is below 1% by weight, the addition of the block copolymer cannot produce a sufficient effect. If the amount thereof exceeds 20% by weight, the deterioration of heat resistance become large.

The filler used in the present invention may be a fibrous, platy, flaky, or powdery filler. Examples of the filler include silica, alumina, titanium oxide, calcium sulfate powder, gypsum, gypsum whiskers, barium sulfate, talc, mica, asbestos, glass fibers, glass beads, glass flakes, carbon fibers, calcium silicate, carbon black, graphite, iron powder, copper powder, molybdenum disulfide, silicon carbide, silicon carbide fibers, silicon nitride, silicon nitride fibers, brass fibers, stainless-steel fibers, potassium titanate fibers, porassium titanate whiskers, titanium oxide whiskers, aromatic polyamide fibers and the like. Particularly preferred fillers for use in the present invention include glass fibers, carbon fibers, and milled glass fibers. The amount of the filler used is preferably from 1 to 200 parts by weight per 100 parts by weight of the sum of the polycarbonate resin and the block copolymer. If the amount of the filler used is below 1 part by weight, the reinforcing effect is small. If the amount thereof exceeds 200 parts by weight, extrusion of the resulting composition becomes difficult.

The composition of the present invention can further contain conventional heat stabilizer, antioxidant, flame retardant, ultraviolet absorber, colorant, release agent, lubricant, and the like.

The present invention will be explained below in more detail with reference to the following Synthesis Example, Examples, and Comparative Examples, but the invention is not limited to the Examples. In these examples, all parts are by weight unless otherwise indicated.

SYNTHESIS EXAMPLE 1

Production of Block Copolymer

Into a reactor equipped with a stirrer, reflux condenser, dropping tube, and nitrogen inlet were introduced 200 g (0.2 mol) of hydrogenated α,ω-1,2-polybutadiene glycol (number-average molecular weight, about 1,000) and 1 g of dibutyltin dilaurate as a catalyst. 800 g (7 mol) of ε-caprolactone was added dropwise thereto with stirring at 190° C. over a period of 2 hours in a nitrogen stream. After completion of the dropwise addition, the contents in the reactor were aged for 3 hours. Thus, 995 g of a reaction product was obtained as a white solid. The reaction product obtained had a number-average molecular weight, as measured by gel permeation chromatography (GPC) and calculated as a polystyrene, of about 10,000 and a hydroxyl value (acetic anhydride method) of about 18. This reaction product in an amount of 500 g was placed in a reactor equipped with a stirrer, reflux condenser, dropping tube, and nitrogen inlet, and 20.6 g of acetic anhydride was added dropwise thereto with stirring at 120° C. over a period of 1 hour in a nitrogen stream. Thereafter, the contents in the reactor were aged at that temperature for 2 hours, and acetic acid and unreacted acetic anhydride were then removed at about 150° C. under a reduced pressure. Thus, 502 g of a white solid (melting point, about 68° C.) was obtained.

This solid (block copolymer; rubber/polyester block = 20/80 by weight ratio) had a number-average molecular weight, as measured by GPC and calculated as a polystyrene, of about 10,000, a hydroxyl value of 1 or less, and an acid value of 2 or less.

EXAMPLE 1

65 Parts of an aromatic polycarbonate resin (Iupilon S-2000, manufactured by Mitsubishi Gas Chemical Company, Inc.) was mixed with 5 parts of the block copolymer obtained in Synthesis Example 1 and 30 parts of glass fibers (03MA 409C; chopped strands having an average fiber diameter of 13 μm and a length of 3 mm; manufactured by Asahi Fiber Glass Co., Ltd., Japan). This mixture was extruded into pellets by a 40 mm single-screw extruder at a cylinder temperature of 300° C. The thus-obtained pellets were molded into test pieces using an injection molding machine at a cylinder temperature of 290° C., and physical properties of the test pieces were measured. With respect to flowability, it was measured with a capillary rheometer (FLOW TESTER CFT-500, SHIMADZU COMRPORATION) using a die of 2 mm × 10 mm at a temperature of 260° C. and a load of 50 kg/cm². The results obtained are shown in Table 1.

EXAMPLE 2

The same procedures as in Example 1 were followed except that glass fibers (03MA 409C) and milled glass fibers (EPG70M-01N; average diameter 13 μm, length 80 μm; manufactured by Nippon Electric Glass Co., Ltd., Japan) were used in combination as a filler according to the formulation shown in Table 1.

The results obtained are shown in Table 1.

EXAMPLE 3

45 Parts of a polycarbonate resin (Iupilon S-2000) was mixed with 5 parts of the copolymer obtained in Synthesis Example 1 and 20 parts of milled glass fibers (EPG70M-01N). This mixture was fed to a twin-screw extruder (TEM-50, manufactured by Toshiba Machine Co., Ltd., Japan) from the rear of the cylinder at a feed rate of 140 kg/hr. Glass fibers (03MA 409C) were fed to the extruder from a side feeder at a feed rate of 60 kg/hr. Thus, pellets were obtained at a cylinder temperature of from 260° to 280° C., and then subjected to property evaluations.

The results obtained are shown in Table 1.

COMPARATIVE EXAMPLE 1

A mixture of 70 parts of a polycarbonate resin (Iupilon S-2000) and 30 parts of glass fibers (03MA 409C) was extruded and evaluated under the same conditions as in Example 1.

The results obtained are shown in Table 1.

COMPARATIVE EXAMPLE 2

A mixture of 65 parts of a polycarbonate resin (Iupilon S-2000), 5 parts of a carbonate oligomer (AL-071, manufactured by Mitsubishi Gas Chemical Company, Inc.), and 30 parts of glass fibers (03MA 409C) was extruded and evaluated under the same conditions as in Example 1.

The results obtained are shown in Table 1.

COMPARATIVE EXAMPLE 3

The same procedures as in Comparative Example 2 were followed except that AL-071 was replaced with a polycaprolactone (Plaskcel H-1P, manufactured by Daicel Chemical Industries, Ltd., Japan) in an amount as shown in Table 1.

The results obtained are shown in Table 1.

COMPARATIVE EXAMPLE 4

The same procedures as in Comparative Example 1 were followed except that part of the glass fibers was replaced with milled glass fibers (EPG70M-01N, manufactured by Nippon Electric Glass Co., Ltd.) in an amount shown in Table 1.

The results obtained are shown in Table 1.

COMPARATIVE EXAMPLE 5

The same procedures as in Example 3 were followed except that the copolymer was not used and the amount of the polycarbonate resin was changed to 50 parts.

The results obtained are shown in Table 1.

As described in the above Examples, the present invention can provide a polycarbonate resin composition which has greatly improved flowability and gives molded articles with improved appearance while retaining good physical properties, e.g., rigidity, of the polycarbonate resin.

While the invention has been described in detail and with reference to specific embodiments thereof, it will be apparent to one skilled in the art that various changes and modifications can be made therein without departing from the spirit and scope thereof.

What is claimed is:

1. A polycarbonate resin composition comprising (a) an aromatic polycarbonate resin, (b) a rubber-polyester block copolymer comprising an aliphatic diene-based rubber having, at one or both ends thereof, a polyester structural unit formed by ring-opening polymerization of an aliphatic lactone with the aliphatic diene-based rubber, and (c) an inorganic filler.

2. A resin composition as claimed in claim 1, wherein the aromatic polycarbonate resin is a thermoplastic polycarbonate produced by reacting either an aromatic dihydroxy compound or the aromatic dihydroxy compound and a small amount of a polyhydroxy compound with phosgene or a carbonic acid ester.

3. A resin composition as claimed in claim 1, wherein the aliphatic diene-based rubber has a number-average molecular weight of from 1,000 and 4,000.

4. A resin composition as claimed in claim 1, wherein the aliphatic diene-based rubber is a polybutadiene compound or a partly or completely hydrogenated polybutadiene compound.

5. A resin composition as claimed in claim 1, wherein the rubber-polyester block copolymer is produced from an aliphatic diene-based rubber having a hydroxyl group at one or both ends of the molecule thereon and an aliphatic lactone by successive ring-opening polymerizing the aliphatic lactone onto the hydroxyl group(s) of the aliphatic diene-based rubber in the presence of a catalyst.

6. A resin composition as claimed in claim 1, wherein the aliphatic lactone is $\epsilon$-caprolactone.

7. A resin composition as claimed in claim 1, wherein the polyester structural unit is terminated by a non-reactive group through an ester bond, an ether bond, or a urethane bond.

8. A resin composition as claimed in claim 1, wherein the amount of the rubber-polyester block copolymer is 1 to 20% by weight based on the weight of the sum of the polycarbonate resin and the block copolymer.

9. A resin composition as claimed in claim 1, wherein the inorganic filler is glass fibers or carbon fibers.

10. A resin composition as claimed in claim 1, wherein the amount of the inorganic filler is 1 to 200 parts by weight per 100 parts by weight of the sum of the polycarbonate resin and the block copolymer.

TABLE 1

|  | Example | | | Comparative Example | | | | |
|---|---|---|---|---|---|---|---|---|
|  | 1 | 2 | 3 | 1 | 2 | 3 | 4 | 5 |
| PC (S-2000) | 65 | 65 | 45 | 70 | 65 | 65 | 70 | 50 |
| PC oligomer (AL-071) |  |  |  |  | 5 |  |  |  |
| Polycaprolactone (H-1P) |  |  |  |  |  | 5 |  |  |
| Block copolymer | 5 | 5 | 5 |  |  |  |  |  |
| GF (03MA 409C) | 30 | 18 | 30 | 30 | 30 | 30 | 18 | 30 |
| Milled GF (EPG70M-01N) |  | 12 | 20 |  |  |  | 12 | 20 |
| Q value ($\times 10^{-2}$ cc/s) | 9.8 | 17.4 | 16.3 | 2.2 | 4.8 | 5.6 | 2.2 | 1.8 |
| Flexural strength (kg/cm$^2$) | 2040 | 1660 | 1700 | 1900 | 1660 | 1780 | 1900 | 1580 |
| Flexural modulus ($\times 10^2$ kg/cm$^2$) | 795 | 574 | 1160 | 640 | 574 | 800 | 640 | 1040 |
| Heat distortion temperature (264 psi; °C.) | 123 | 123 | 117 | 150 | 145 | 118 | 150 | 149 |
| Appearance (visual examination) | ○ | ○ | Δ | X | Δ | Δ | X | X |

Note: PC denotes polycarbonate and GF denotes glass fibers.
○: Excellent, Δ: Good, X: Poor